April 21, 1925.
J. ALBRECHT
1,534,349
TAPE CONTROLLED MEASURING PUMP
Filed Oct. 27, 1921
2 Sheets-Sheet 2

Inventor
John Albrecht.
By Morsell & Keeney,
Attorneys.

Patented Apr. 21, 1925.

1,534,349

UNITED STATES PATENT OFFICE.

JOHN ALBRECHT, OF KEWAUNEE, WISCONSIN.

TAPE-CONTROLLED MEASURING PUMP.

Application filed October 27, 1921. Serial No. 510,939.

*To all whom it may concern:*

Be it known that I, JOHN ALBRECHT, a citizen of the United States, and resident of Kewaunee, in the county of Kewaunee and State of Wisconsin, have invented new and useful Improvements in Tape - Controlled Measuring Pumps, of which the following is a description, reference being had to the accompanying drawings, which are a part of this specification.

This invention relates to improvements in tape controlled measuring pumps and has for its object to provide a measuring pump mechanism which may be controlled from a distance by a tape so as to determine accurately the amount of skim milk or whey permitted to be pumped by the patron of a creamery or cheese factory in partial exchange for whole milk delivered by him, the amount of liquid drawn from the pump being varied at the will of the weigher so as to be proportionate to the quantity of whole milk received from the patron, and the pump becoming automatically locked when the quantity which it has been set to deliver has been drawn therefrom.

The present invention relates to certain improvements in the pump shown and described in my Patent No. 968,827 issued August 30, 1910; and a more specific object of the present invention is to simplify and improve the construction of a measuring pump for the purpose mentioned.

The invention consists in the novel constructions, arrangements and devices to be hereinafter described and claimed for carrying out the above stated objects and such other objects as will appear from the following description of a certain preferred embodiment illustrated in the accompanying drawings, wherein—

Like characters of reference designate like parts in the several views.

Figure 1:
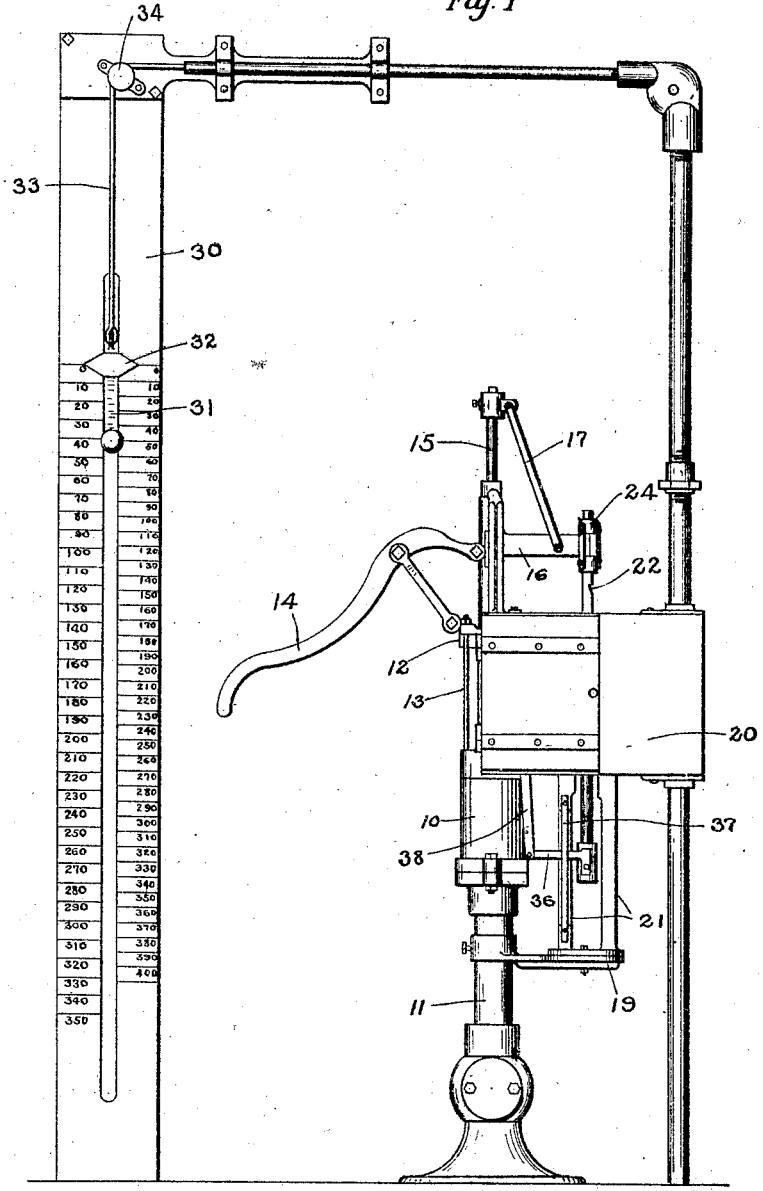
Fig. 1 is a side elevational view of a measuring pump, operatively connected to a suitable indicator mechanism, embodying the principles of my invention.

Referring now to the drawings, 10 indicates a pump proper mounted on a suitable pedestal 11 and having its top or cap portion 12 secured in place by means of bolts 13, the operating handle 14 being pivotally supported on said cap portion. The plunger rod 15 of the pump has securely fastened to it a bracket arm 16 with preferably a brace connection 17 from its outwardly extended end to the upper end of the plunger rod 15 above the guide 17 for said plunger rod which is carried by the cap portion 12 of the pump.

The details of pump construction are not essential to the invention, but are briefly mentioned in order to show the locking connection of the controlling means therewith.

A base plate 19 is adjustably secured to the trunk portion of the pump pedestal 11 so as to stand at the desired elevation and at the proper angle, with relation to the pump parts for the support of the controlling mechanism which is contained within a box like frame 20 supported on the base plate 19 by means of standards 21. A locking rod 22 passes vertically through the casing 20 and is guided in upper and lower bearings formed in a frame 23, as clearly shown in Fig. 2, forming an integral part of the supporting standards 21. At its upper end the locking rod 22 carries a clamping member 24 for releasably clamping the bracket arm 16 of the pump plunger rod to cause said locking rod to move in unison with the plunger rod. At its intermediate portion the locking rod 22 is provided with engaging notches 25 on opposite sides thereof to be engaged by a dog 26, on one side and a dog 27 on the other side, said dogs being pivotally mounted on the frame 23 and the former extending upwardly while the latter extends downwardly so as to effect a locking engagement with the locking rod 22 that will prevent its movement in either direction. A coil spring 28 serves to move dog 26 into its locking engagement with the locking rod 22 while a spring 29 does likewise with dog 27.

The pump mechanism is usually located outside of the building while the gage is contained within the building at the position of the weigher. The gage comprises a vertical slotted guide 30 in the slot of which a runner 31 slides carrying a pointer 32 to travel over lines of graduations marked on either side of the guide, one series indicating the position of the slide for measuring the skim milk and the other series indicating the position of the slide for measuring whey and the numbers of graduation lines in each instance indicating the number of pounds of whole milk for which the proper quantity of whey or skim milk is to be delivered. A flexible tape or chain 33 running over suitable pulleys 34, only one being shown in the drawings, is connected at one end to the pointer 32 and at the other end to a gravity operating bar 35.

The normal position of the indicator 32 is at zero and when the indicator is in that position, the bar 35 is in its lowermost position and by means of locking mechanism presently to be described, the dogs 26 and 27 are positioned to lock the rod 22 against movement. The pump can only be unlocked by the weigher pulling down on the indicator 32 which, of course, results in the bar 35 being pulled upwardly out of its normal position. The means for permitting the bar 35 to descend from such position will now be described.

The locking rod 22 has an arm 36 secured to its lower end and passing through a guide slot formed between one of the standards 21 and the strip 37 secured thereto. The arm 36 is connected by means of a link 38 to a member 39 which carries a pawl 40 adapted to engage a ratchet wheel 41. The ratchet wheel 41 carries a pinion 42 in mesh with a gear 43 mounted on a shaft 44. The pawl 40 is preferably formed of four parts placed side by side and graduated in length in order to provide a smaller movement of the ratchet wheel than is provided by the spacing of the teeth of said ratchet wheel so as to prevent the person drawing more milk than he is entitled to receive by causing the pump to take short strokes. A stop member 45 fixed to the pawl 40 is positioned between a pair of upright members 46 to limit movement of the pawl. The shaft 44 is provided with a cam in the form of a set screw 47 which engages an arm 48 pivoted on a stud 49. An escapement pawl 50 also pivotally mounted on the stud 49 is adapted to enage teeth 35ᵃ which are formed on one side of the bar 35. The escapement pawl carries an arm 51 which forms a support for the arm 48, the latter being yieldably connected to an arm 52 provided on the escapement pawl by means of a coiled spring 53. As the pump handle is manipulated, the shaft 44 is rotated as has been heretofore described and the escapement pawl is operated to permit the bar 35 to descend step-by-step.

The bar 35 is provided with a notch 35ᵇ into which a gravity operating latch member 54 drops when the bar 35 descends to its lowermost or normal position, that is to say, when the indicator 32 reaches zero position on the gauge. A locking bar 55 pivotally connected to the dogs 26 and 27 is normally held by the spring 29 so that its outer end bears against the upper end of the latch 54. The latch 54 is provided with an arm 54ᵃ the upper end of which overrides the top of the bar 55 to limit upward movement of said bar.

Figure 2:
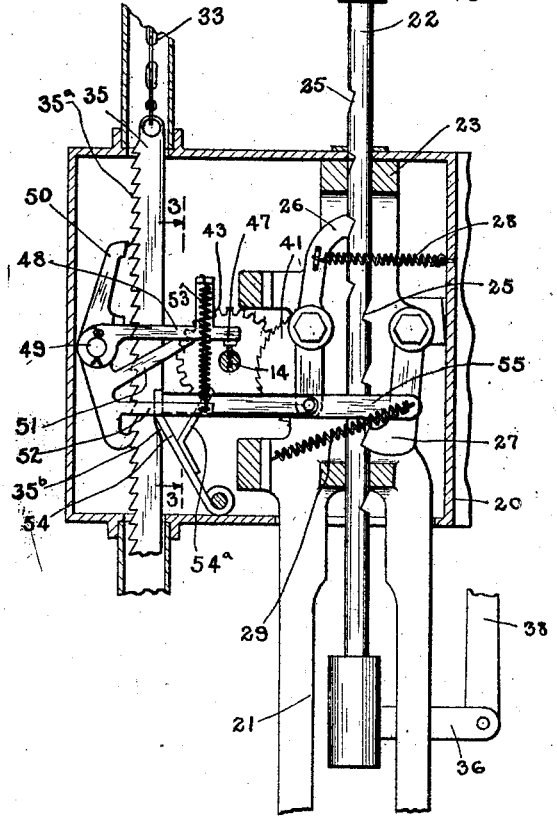
Fig. 2 is a vertical sectional view taken through the mechanism for controlling the operation of the pump, the view point being from the side opposite the view point of Fig. 1.
Figure 3:
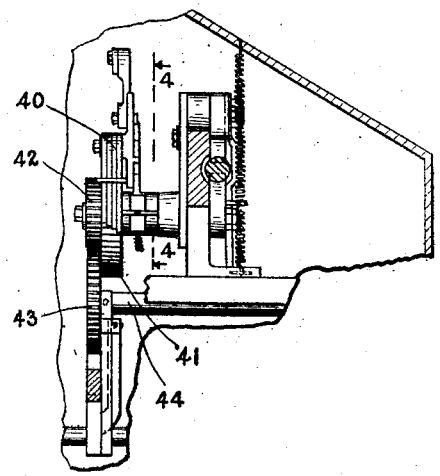
Fig. 3 is a sectional view taken approximately on the line 3—3 of Fig. 2.
Figure 4:
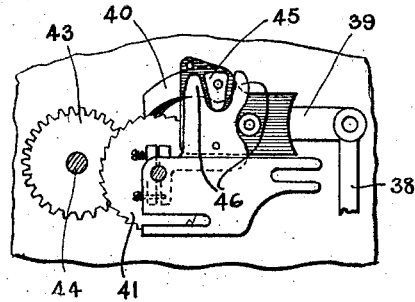
Fig. 4 is a detail sectional view taken on the line 4—4 of Fig. 3.

It will now be apparent when the weigher pulls the indicator 32 downwardly relative to the gauge 30, thereby pulling the bar 35 upwardly, that the latch 54 will be moved to the right, with respect to Fig. 2, so that the bar 55 is also moved to the right and the pawls 26 and 27 are thrown out of engagement with the rod 22. When the parts are in this position, therefore, the pump may be manipulated to draw off the proper amount of milk as determined by the weigher. As the pump handle is manipulated, the ratchet 41 is driven which in turn causes the shaft 44 to be rotated and the bar 35, through the escapement mechanism described, is permitted to descend step-by-step until the indicator reaches the zero position on the gauge in which position the latch 54 will swing into the notch 35ᵇ of the bar 35 thus permitting the locking bar 55 to move to the left and causing the dogs 26 and 27 to lock the rod 22 against movement. The locking mechanism is very simple and reliable in its operation.

I claim:

1. Apparatus of the class described comprising a normally locked pump including a reciprocable rod, arranged to reciprocate as the pump is operated, a cam member, means operable by the reciprocations of said rod to manipulate said cam member, a bar, indicator mechanism associated with said bar and manually operated to unlock the pump, means operable by said cam member for controlling the movement of said bar in one direction, and locking mechanism associated with said bar which operates automatically upon the bar reaching a predetermined position to lock said rod and the pump against operation.

2. Apparatus of the class described comprising a normally locked pump including a reciprocable notched rod, arranged to reciprocate as the pump is operated, a cam member, means operable by the reciprocations of said rod to manipulate said cam member, a bar, indicator mechanism associated with said bar, and manually operated to unlock the pump, means operable by said cam member for controlling the movement of said bar in one direction, a pair of pivoted dogs engaging said rod, and locking mechanism connected to said dogs and associated with said bar which operates automatically upon the bar reaching a predetermined position to cause said dogs to lock said rod and the pump against operation.

3. Apparatus of the class described comprising a normally locked pump including a reciprocable notched rod, arranged to reciprocate as the pump is operated, a cam member, means operable by the reciprocations of said rod to manipulate said cam member, a bar, indicator mechanism associated with said bar, and manually actuated to unlock the pump, means operable by said cam member for controlling the movement of said bar in one direction, a pair of pivoted dogs engaging said rod, a gravity operating latch, said bar having a notch to receive said latch when the bar reaches a predetermined position, and a locking bar connected to said dogs and associated with said latch for automatically locking said rod and the pump against operation when said bar reaches said position.

4. Apparatus of the class described comprising a normally locked pump including a reciprocable notched rod arranged to reciprocate as the pump is operated, a cam member, means operable by the reciprocations of said rod to manipulate said cam member, a gravity operating bar, indicator mechanism associated with said bar, and manually actuated to unlock the pump, means operable by said cam member to permit said bar to descend step-by-step, a pair of pivoted dogs engaging said rod, a locking bar connected to said dogs, a spring maintaining said dogs in engagement with said rod, and a gravity latch to position said locking bar so that said dogs are out of engagement with said rod during the operation of the pump, said latch, locking bar and dogs when the bar reaches a predetermined position operating automatically to lock said rod and the pump against movement.

5. In apparatus of the class described the combination of a normally locked pump including a reciprocable rod, arranged to reciprocate as the pump is operated, a cam member, means operable by the reciprocations of said rod to manipulate said cam members, a toothed bar, indicator mechanism associated with said bar and manually actuated to unlock the pump, and an escapement pawl associated with said bar and to be operated by said cam member, for the purpose specified.

6. In apparatus of the class described the combination of a normally locked pump including a reciprocable rod, arranged to reciprocate as the pump is operated, a cam member, means operable by the reciprocations of said rod to manipulate said cam member, a toothed bar, indicator mechanism associated with said bar and manually actuated to unlock the pump, an escapement pawl associated with said bar, a pivoted arm bearing against said cam member, and means operably connecting said arm to said pawl, for the purpose specified.

7. In apparatus of the class described the combination of a normally locked pump including a reciprocable rod, arranged to reciprocate as the pump is operated, a rotating cam member, means operable by the reciprocation of said rod to drive said member, a toothed bar, indicator mechanism associated with said bar, and manually actuated to unlock the pump, an escapement pawl engaging said bar, a pivoted arm bearing against said cam member, said pawl having an arm, and a spring yieldable connecting said arms, for the purpose specified.

8. Apparatus of the class described comprising a normally locked pump including a reciprocable rod arranged to reciprocate as the pump is operated, a cam member, means operable by the reciprocation of said rod to manipulate said cam member, a toothed bar, indicator mechanism associated with said bar, and manually actuated to unlock the pump, an escapement pawl associated with said bar and operated by said cam member, and locking mechanism associated with said bar which operates automatically upon the bar reaching a predetermined position to lock said rod and the pump.

9. Apparatus of the class described comprising a normally locked pump including a reciprocable notched rod arranged to reciprocate as the pump is operated, means operable by the reciprocation of said rod to manipulate said cam member, a toothed bar, indicator mechanism associated with said bar, and manually actuated to unlock the pump, an escapement pawl associated with said bar and operated by said cam member, a pair of pivoted dogs engaging said rod, locking mechanism connected to said dogs and associated with said bar which operates automatically upon the bar reaching a predetermined position to cause said dogs to lock said rod and the pump.

10. Apparatus of the class described comprising a normally locked pump including a reciprocable notched rod arranged to reciprocate as the pump is operated, a cam member, means operable by the reciprocation of said rod to manipulate said cam member, a toothed bar, indicator mechanism associated with said bar and manually actuated to unlock the pump, an escapement pawl associated with said bar and operated by said cam member to permit said bar to descend step-by-step, a pair of pivoted dogs engaging said rod, a gravity operating latch, said bar having a notch adapted to receive said latch when the bar reaches a predetermined position, and a locking bar connected to said dogs and associated with said latch for automatically locking said rod and the pump when said bar reaches said position.

In testimony whereof, I affix my signature.

JOHN ALBRECHT.